United States Patent
Wang et al.

(10) Patent No.: US 12,532,344 B2
(45) Date of Patent: Jan. 20, 2026

(54) RESOURCE SELECTION METHOD AND APPARATUS, AND ELECTRONIC DEVICE

(71) Applicant: VIVO MOBILE COMMUNICATION CO., LTD., Dongguan (CN)

(72) Inventors: Huan Wang, Dongguan (CN); Shuyan Peng, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 399 days.

(21) Appl. No.: 18/125,722

(22) Filed: Mar. 23, 2023

(65) Prior Publication Data

US 2023/0232441 A1 Jul. 20, 2023

Related U.S. Application Data

(63) Continuation of application No. PCT/CN2021/120452, filed on Sep. 24, 2021.

(30) Foreign Application Priority Data

Sep. 25, 2020 (CN) .......................... 202011025678.7

(51) Int. Cl.
*H04W 72/542* (2023.01)
*H04W 72/11* (2023.01)
(Continued)

(52) U.S. Cl.
CPC .......... *H04W 72/542* (2023.01); *H04W 72/11* (2023.01); *H04W 76/18* (2018.02); *H04W 72/541* (2023.01)

(58) Field of Classification Search
CPC ..... H04W 72/02; H04W 72/11; H04W 72/40; H04W 72/541; H04W 72/542; H04W 72/563; H04W 76/14; H04W 76/18
See application file for complete search history.

(56) References Cited

U.S. PATENT DOCUMENTS

2022/0095171 A1* 3/2022 Hosseini ............... H04W 72/02

FOREIGN PATENT DOCUMENTS

| CN | 110719610 A | 1/2020 |
|---|---|---|
| CN | 110972273 A | 4/2020 |

(Continued)

OTHER PUBLICATIONS

First Office Action issued in related Chinese Application No. 202011025678.7, mailed Jan. 26, 2025, 11 pages.
(Continued)

*Primary Examiner* — Kashif Siddiqui
(74) *Attorney, Agent, or Firm* — IPX PLLC

(57) ABSTRACT

A resource selection method and apparatus, and an electronic device, are provided. The resource selection method includes: performing, by a sending terminal, any one of the following operations on periodic resources selected and/or reserved by the sending terminal: performing resource selection re-evaluation on the periodic resources in a case that a preset re-evaluation condition is met; using an independent parameter for resource pre-emption detection of the periodic resources in a case that a preset resource pre-emption detection condition is met; releasing the periodic resources and/or performing resource re-selection from the periodic resources in a case that a preset resource selection triggering condition is met; and excluding the periodic resources from a candidate resource set in a case that a preset resource exclusion condition is met.

20 Claims, 6 Drawing Sheets

(51) Int. Cl.
*H04W 72/541* (2023.01)
*H04W 76/18* (2018.01)

(56) References Cited

FOREIGN PATENT DOCUMENTS

| | | | | |
|---|---|---|---|---|
| WO | 2020017939 A1 | 1/2020 | | |
| WO | WO-2021031043 A1 * | 2/2021 | ............ | H04W 24/02 |

OTHER PUBLICATIONS

Vivo, "Remaining issues on mode 2 resource allocation mechanism", 3GPP tsg_ran\wg1_rl1, R1-2005340, Aug. 2020, 10 pages.
International Search Report issued in corresponding International Application No. PCT/CN2021/120452, mailed Dec. 21, 2021, 4 pages.
Huawei et al., Remaining details of sidelink resource allocation mode 2, 3GPP TSG RAN WG1 Meeting #100bis-e, R1-2001552, Apr. 30, 2020, 22 pages.
OPPO, Discussion on remaining open issue for mode 2, 3GPP TSG-RAN WG1 Meeting #100e, R1-2000493, Mar. 6, 2020, 14 pages.

* cited by examiner

A sending terminal performs any of the following operations on periodic resources selected and/or reserved by the sending terminal: performing resource selection re-evaluation on the periodic resources in a case that a preset re-evaluation condition is met; using an independent parameter for resource preemption detection of the periodic resources in a case that a preset resource preemption detection condition is met; releasing the periodic resources and/or performing resource re-selection from the periodic resources in a case that a preset resource selection triggering condition is met; and excluding the periodic resources from a candidate resource set in a case that a preset resource exclusion condition is met ⟋101

FIG. 3

RESOURCE SELECTION METHOD AND APPARATUS, AND ELECTRONIC DEVICE

CROSS-REFERENCE TO RELATED APPLICATIONS

This application is a continuation of International Application No. PCT/CN2021/120452, filed on Sep. 24, 2021, which claims priority to Chinese Patent Application No. 202011025678.7, filed on Sep. 25, 2020. The entire contents of each of the above-identified applications are expressly incorporated herein by reference.

TECHNICAL FIELD

This application relates to the field of communications technologies, and in particular, to a resource selection method and apparatus, and an electronic device.

BACKGROUND

Due to the design of New Radio (NR) SideLink (SL) resource selection, resources periodically reserved by a Transmitter User Equipment (TX UE) are not necessarily real reserved resources for surrounding UE (that is, the surrounding UE are still prone to select the periodic resources). For example, reservation signaling of the TX UE is sent before a resource monitoring window, or no periodic resources in a period are reserved for a next period of the period. In this case, the surrounding UE is incapable of detecting a periodic resource of the TX UE when performing resource selection, causing resource collision or interference.

SUMMARY

Embodiments of this application provide a resource selection method and apparatus, and an electronic device.

According to a first aspect, an embodiment of this application provides a resource selection method. The resource selection method includes:
performing, by a sending terminal, any one of the following operations on periodic resources selected and/or reserved by the sending terminal:
performing resource selection re-evaluation on the periodic resources in a case that a preset re-evaluation condition is met;
using an independent parameter for resource pre-emption detection of the periodic resources in a case that a preset resource pre-emption detection condition is met;
releasing the periodic resources and/or performing resource re-selection from the periodic resources in a case that a preset resource selection triggering condition is met; and
excluding the periodic resources from a candidate resource set in a case that a preset resource exclusion condition is met.

According to a second aspect, an embodiment of this application provides a resource selection apparatus. The apparatus includes:
a processing module, configured to perform any one of the following operations on selected and/or reserved periodic resources:
performing resource selection re-evaluation on the periodic resources in a case that a preset re-evaluation condition is met;
using an independent parameter for resource pre-emption detection of the periodic resources in a case that a preset resource pre-emption detection condition is met;
releasing the periodic resources and/or performing resource re-selection from the periodic resources in a case that a preset resource selection triggering condition is met; and
excluding the periodic resources from a candidate resource set in a case that a preset resource exclusion condition is met.

According to a third aspect, an embodiment of this application provides an electronic device, including a processor, a memory, and a program or an instruction stored in the memory and executable by the processor, where when the program or instruction is executed by the processor, the steps of the foregoing method are implemented.

According to a fourth aspect, an embodiment of this application provides a readable storage medium. The readable storage medium stores a program or an instruction, and when the program or instruction is executed by a processor, the steps of the foregoing method are implemented.

According to a fifth aspect, an embodiment of this application provides a chip. The chip includes a processor and a communications interface, where the communications interface is coupled to the processor, and the processor is configured to run a program or an instruction to implement the method according to the first aspect.

In the embodiments of this application, when a certain condition is met, a sending terminal performs resource selection re-evaluation on periodic resources selected and/or reserved by the sending terminal; uses an independent parameter for resource pre-emption detection of the periodic resources; releases the periodic resources and/or performs resource re-selection from the periodic resources; or excludes the periodic resources from a candidate resource set.

BRIEF DESCRIPTION OF DRAWINGS

To describe the embodiments of this application, the following describes the accompanying drawings required for describing the embodiments of this application. Apparently, the accompanying drawings in the following description show merely some embodiments of this application, and a person of ordinary skill in the art may derive other drawings from these accompanying drawings without creative efforts.

FIG. 3 is a schematic flowchart of a resource selection method according to an embodiment of this application;

DETAILED DESCRIPTION

Figure 1:
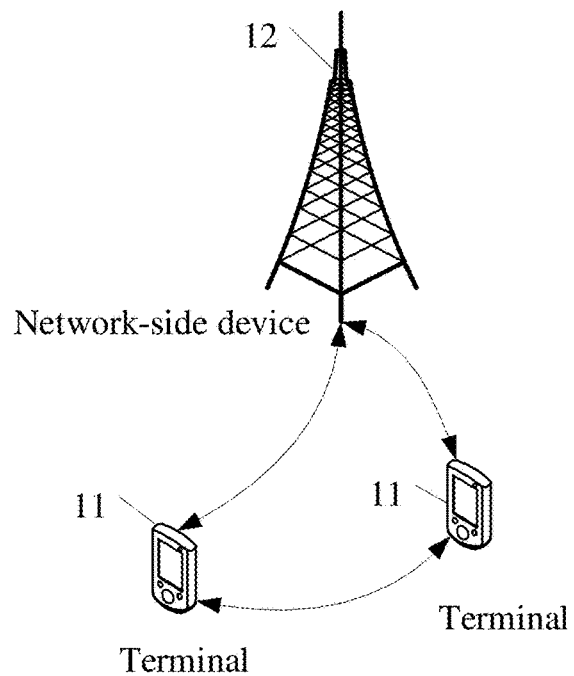
FIG. 1 is a schematic diagram of a wireless communications system.

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first," "second," and the like in the specification and claims of this application are used to distinguish between similar objects instead of describing a specific order or sequence. It should be understood that the data used in this way is interchangeable in appropriate circumstances so that the embodiments of this application described can be implemented in other orders than the order illustrated or described herein. In addition, in the specification and the claims, "and/or" represents at least one of connected objects, and a character "l" generally represents an "or" relationship between associated objects.

The technology described in this specification is not limited to a Long Term Evolution (LTE)/LTE-Advanced (LTE-A) system, and may also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" are often interchangeably used. The CDMA system may implement wireless technologies such as CDMA2000 and Universal Terrestrial Radio Access (UTRA). UTRA includes Wideband CDMA (WCDMA) and other CDMA variants. The TDMA system can implement a radio technology such as Global System for Mobile Communication (GSM). The OFDMA system can implement radio technologies such as Ultra Mobile Broadband (UMB), Evolved-UTRA (Evolution-UTRA, E-UTRA), IEEE 802.11 (Wi-Fi), IEEE 802.16 (WiMAX), IEEE 802.20, and Flash-OFDM. UTRA and E-UTRA are parts of the Universal Mobile Telecommunications System (UMTS). LTE and more advanced LTE (such as LTE-A) are new UMTS versions that use E-UTRA. UTRA, E-UTRA, UMTS, LTE, LTE-A, and GSM are described in the literature from an organization called 3rd Generation Partnership Project (3GPP). CDMA2000 and UMB are described in the literature from an organization called "3rd Generation Partnership Project 2" (3GPP2). The technologies described in this specification may be used in the systems and radio technologies mentioned above, and may also be used in another system and radio technology. However, an NR system is described in the following description for illustrative purposes, and an NR terminology is used in most of the following description, although these technologies can also be applied to applications other than the NR system application.

The following description provides examples without limiting the scope, applicability, or configuration set forth in the claims. The functions and arrangements of the elements under discussion may be changed without departing from the spirit and scope of the present disclosure. In the examples, various procedures or components may be appropriately omitted, replaced, or added. For example, the described method may be performed in an order different from that described, and steps may be added, omitted, or combined. In addition, features described with reference to some examples may be combined in other examples.

Referring to FIG. 1, FIG. 1 is a block diagram of a wireless communications system to which embodiments of this application can be applied. The wireless communications system includes a terminal 11 and a network-side device 12. The terminal 11 may be alternatively referred to as a terminal device or User Equipment (UE). The terminal 11 may be a terminal side device such as a mobile phone, a tablet personal computer, a laptop computer, a Personal Digital Assistant (PDA), a Mobile Internet Device (MID), a wearable device, or an in-vehicle device. It should be noted that a specific type of the terminal 11 is not limited in this embodiment of this application. The network-side device 12 may be a base station or a core network. The base station may be a base station of 5G or a later version (for example, gNB or 5G NR NB), or a base station in another communications system (for example, an eNB, a WLAN access point, or another access point), or a location server (for example, an E-SMLC or an Location Manager Function (LMF)). The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specified technical term. It should be noted that, in the embodiments of this application, only a base station in an NR system is used as an example, but a specific type of the base station and a specific communications system are not limited in the embodiments of this application.

There are two New Radio (NR) SideLink (SL) resource allocation modes: a base station scheduling mode (mode 1), and an independent resource selection mode based on UE (mode 2). With regard to the resource allocation mode based on base station scheduling, a sidelink resource used by the UE for data transmission is determined by the base station, and TX UE is notified by downlink signaling. With regard to the resource allocation mode based on independent resource selection of the UE, the UE selects an available transmission resource from a (pre-) configured resource pool, and before resource selection, the UE performs channel monitoring, selects a resource set with less interference according to a result of the channel monitoring, and then randomly selects a resource for transmission from the resource set.

A specific working manner in mode 2 is as follows.

(1) After resource selection is triggered, the TX UE first determines a resource selection window, where a lower boundary of the resource selection window is at a moment T1 after the resource selection is triggered, and an upper boundary of the resource selection window is a moment T2 after the resource selection is triggered.

T2 is a value selected by the UE in a Packet Delay Budget (PDB) transmitted in a Transport Block (TB) of the UE, and T2 is not earlier than T1.

(2) Before resource selection, the UE needs to determine a candidate resource set for resource selection, and compare a Reference Signal Received Power (RSRP) measured on a resource in the resource selection window with a corresponding RSRP threshold (RSRP and RSRP threshold are determined based on a sensing result, instead of directly obtained via measurement on the resource in the resource selection window). If the RSRP is greater than the RSRP threshold, the resource is excluded and cannot be included in the candidate resource set. After resource exclusion, remaining resources in the resource selection window form the candidate resource set.

Resources in the candidate resource set account for at least 20% of resources in the resource selection window. If the resources in the candidate resource set account for less than x % (for example, x=20/40/60) of the resources in the resource selection window, the RSRP threshold needs to be increased based on a step-by-step value (3 dB), and then resource exclusion is performed until no less than x % of the resources can be selected.

(3) After the candidate resource set is determined, the UE randomly selects a transmission resource from the candidate resource set. In addition, the UE can reserve a transmission resource for a next transmission in this transmission.

Figure 2:
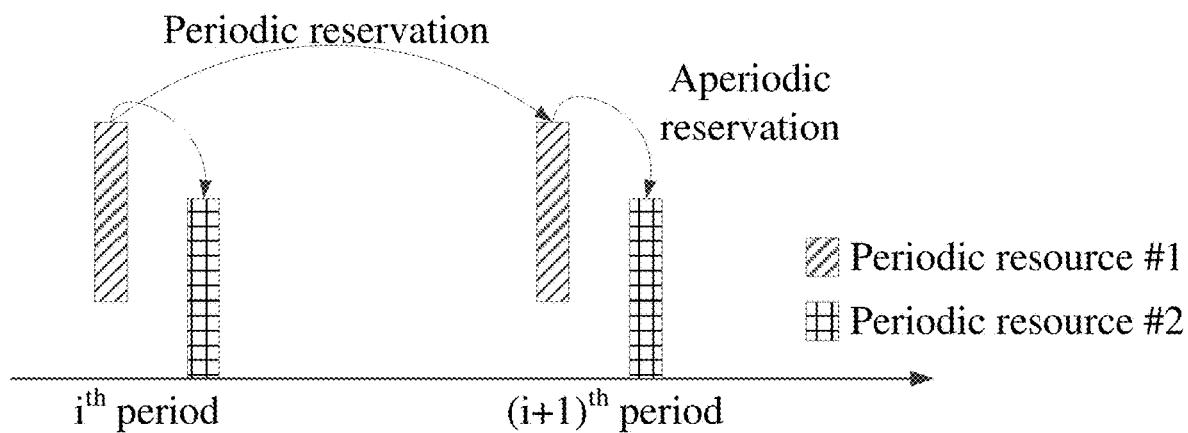
FIG. 2 is a schematic diagram of resource reservation performed by a sending terminal for a resource selected by the sending terminal.

As shown in FIG. 2, in an NR SL, the TX UE performs resource reservation on resources selected by the TX UE (the reservation includes periodic reservation and aperiodic reservation). The reserved resources are used for future transmission of a Physical Sidelink Control CHannel (PSCCH) and/or a Physical Sidelink Share CHannel (PSSCH).

The aperiodic reservation may be implemented based on the field Time resource assignment in Sidelink Control Information (SCI). Resources reserved via aperiodic reservation can be used for transmission of at least one TB.

The periodic reservation may be implemented based on the field Resource reservation period in the SCI. Periodic resources currently reserved via periodic reservation can be used for transmission of a next TB or several TBs.

A re-evaluation mechanism for resource selection is supported in a resource allocation mode (mode 2). The mechanism is described briefly as follows: The UE re-evaluates resource selection at least at a moment "m-T3" to determine whether resources (PSCCH and/or PSSCH resources) that have been selected but not reserved are still in an idle or low-interference state, where a moment "m" is a moment when reservation information of the resource is sent for the first time, and T3 includes at least duration of performing resource selection processing by the UE. The UE re-executes a resource selection step at least at "m-T3" to obtain the candidate resource set. If the resource selected by the UE is still in the candidate resource set, the UE does not need to perform resource re-selection. Otherwise, the UE selects another transmission resource from the candidate resource set. (In other words, the UE first obtains an RSRP threshold for determining the candidate resource set. The UE obtains a priority that corresponds to a re-evaluated resource and that is in SCI for reserving the resource and an RSRP value obtained by monitoring the resource, and compares the RSRP value with an RSRP threshold corresponding to the priority. If the RSRP value is greater than the RSRP threshold, the UE performs resource re-selection; otherwise, no resource re-selection is required).

A resource pre-emption mechanism is supported in the resource allocation mode (mode 2). The mechanism is described briefly as follows: Resources reserved by one UE are overlapped with resources reserved or selected by another UE having a higher priority service (partially overlapped). A priority of a service packet to be sent by the UE is lower than a pre-configured priority. The UE triggers resource re-selection when an SL-RSRP measurement value obtained by the UE on an associated resource is greater than an associated SL-RSRP threshold.

The UE performs pre-emption detection at least at a moment "m-T3" to determine whether reserved resources (PSCCH and/or PSSCH resources) are pre-empted, where a moment "m" is a moment where the resource is located or a moment when reservation information of the resource is sent, and T3 includes at least duration of performing resource selection processing by the UE. The UE re-executes a resource selection step at least at "m-T3" to obtain a candidate resource set. If the resource selected by the UE is still in the candidate resource set, the UE does not need to perform resource re-selection; otherwise, the UE selects another transmission resource from the candidate resource set.

In addition, if a re-selected resource is a periodic resource, whether to periodically reserve the re-selected resource depends on UE implementation.

Resource selection re-evaluation is used to detect whether to re-select an un-reserved resource. The resource pre-emption detection is used to detect whether to re-select a reserved resource. However, due to the design of NR SL resource selection, resources periodically reserved by the TX UE are not necessarily real reserved resources for surrounding UE (that is, the surrounding UE is still prone to select the periodic resources). For example, reservation signaling of the TX UE is sent before a resource monitoring window, or no periodic resources in a previous period are reserved for a current period. In this case, the surrounding UE is incapable of detecting a periodic resource of the TX UE when performing resource selection, causing resource collision or interference. According to existing description, only resource pre-emption detection can be performed on periodically reserved resources, and the TX UE needs to perform comparison of priorities of data packets with the surrounding UE. As a result, the foregoing problems of resource collision or interference can be resolved only when a specific data packet is sent, which has certain limitations.

In addition, in a case that resource re-selection triggered by resource selection re-evaluation and resource pre-emption detection is for a periodic resource, if the UE periodically reserves the re-selected resource and does not release the periodic resource (that is, only a resource corresponding to a period when the re-selection occurs is released, and the periodic resource in a period after this period is not released), the UE may reserve too many resources, resulting in a heavy system load.

In addition, when the UE performs resource selection, each SL grant independently selects resources. As a result, resources of different SL grants are overlapped in time.

An embodiment of this application provides a resource selection method. As shown in FIG. 3, the method includes the following step:

Step 101: A sending terminal performs any one of the following operations on periodic resources selected and/or reserved by the sending terminal:

performing resource selection re-evaluation on the periodic resources in a case that a preset re-evaluation condition is met;

using an independent parameter for resource pre-emption detection of the periodic resources in a case that a preset resource pre-emption detection condition is met;

releasing the periodic resources and/or performing resource re-selection from the periodic resources in a case that a preset resource selection triggering condition is met; and excluding the periodic resources from a candidate resource set in a case that a preset resource exclusion condition is met.

In this embodiment, when a certain condition is met, a sending terminal performs resource selection re-evaluation on periodic resources selected and/or reserved by the sending terminal; uses an independent parameter for resource pre-emption detection of the periodic resources; releases the periodic resources and/or performs resource re-selection from the periodic resources; or excludes the periodic resources from a candidate resource set. Through the above operations, the problems of resource collision and resource interference can be resolved, to enhance reliability of sidelink transmission.

The performing resource selection re-evaluation on the periodic resources in a case that a preset re-evaluation condition is met includes any one of the following:

For a resource in the $(i+1)^{th}$ period of the periodic resources, perform resource selection re-evaluation on the resource before using the resource in a case that the sending terminal does not send, in N periods before the $(i+1)^{th}$ period, SCI to periodically reserve the resource in the $(i+1)^{th}$ period, where i and N are positive integers, and the N periods may be N consecutive periods or in-consecutive periods. In an NR SL, the TX UE reserves resources selected by the TX UE. Reservation includes periodic reservation and aperiodic reservation. The reserved resources are used for future PSCCH and/or PSSCH transmission. The aperiodic reservation may be implemented based on the field Time resource assignment in SCI. Resources reserved via aperiodic reservation can be used for transmission of at least one TB. The periodic reservation may be implemented based on the field Resource reservation period in the SCI. Periodic resources currently reserved via periodic reservation can be used for transmission of a next TB.

For a resource in the $(i+1)^{th}$ period of the periodic resources, perform resource selection re-evaluation on the resource before using the resource in a case that the sending terminal does not send, in M time units before the $(i+1)^{th}$ period, SCI to periodically reserve the resource in the $(i+1)^{th}$ period, where M is a positive integer, and may be a maximum quantity of resource reservation periods configured for a 1000 ms/resource pool, and the time unit may be an absolute time unit, for example, second, millisecond, slot, sub-slot, or logical slot.

For a resource in the $(i+1)^{th}$ period of the periodic resources, perform resource selection re-evaluation on at least part of the resource in the $(i+1)^{th}$ period in a case that a quantity of resources that are not indicated by periodic reservation information in L periods before the $(i+1)^{th}$ period reaches a preset value, where L is a positive integer, the L periods may be L consecutive periods or in-consecutive periods, and resource selection re-evaluation may be performed on some or all resources in the $(i+1)^{th}$ period.

If resource selection re-evaluation needs to be performed on the periodic resource in the $(i+1)^{th}$ period, the performing resource selection re-evaluation on the periodic resource in the $(i+1)^{th}$ period includes the following steps:

Perform, in the $(i+1)^{th}$ period, aperiodic resource reservation indication on the resource, and perform resource selection re-evaluation at a first moment before the aperiodic reservation indication is performed on the resource for the first time, where the first moment is not later than a second moment, the second moment is before a moment m, an interval between the second moment and the moment m is T3, the moment m is a moment when aperiodic resource reservation indication information is sent for the first time, and T3 includes at least duration of performing resource selection processing by the sending terminal.

Resource selection re-evaluation may be performed on the resource at the moment m-T3, or at another moment before the aperiodic resource reservation indication is performed on the resource. In some implementations, whether to perform the resource selection re-evaluation at the foregoing moment depends on UE implementation; or the UE needs to perform resource selection re-evaluation at the moment m-T3, and whether to perform resource selection re-evaluation at a moment different from the moment m-T3 depends on UE implementation.

L, M, N, and the preset value may be configured or pre-configured by a control node, or stipulated in a protocol.

In some embodiments, the performing resource selection re-evaluation on the periodic resources in a case that a preset re-evaluation condition is met includes the following steps:

Perform, in the $j^{th}$ period before the $(i+1)^{th}$ period, resource selection re-evaluation on the resource in the $(i+1)^{th}$ period, where j is a positive integer less than or equal to i, and may be i, i−1, i−2, . . . .

For example, resource selection re-evaluation may be performed before reservation (for example, periodic reservation) is performed, in the $j^{th}$ period, on the resource in the $(i+1)^{th}$ period. Perform, in the $j^{th}$ period, periodic resource reservation indication on the resource in the $(i+1)^{th}$ period, and perform resource selection re-evaluation at a first moment before the periodic reservation indication is performed on the resource for the first time, where the first moment is not later than a second moment, the second moment is before a moment m, an interval between the second moment and the moment m is T3, the moment m is a moment when periodic resource reservation indication information is sent for the first time, and T3 includes at least duration of performing resource selection processing by the sending terminal. In some implementations, whether to perform the resource selection re-evaluation at the foregoing moment depends on UE implementation; or the UE needs to perform resource selection re-evaluation at the moment m-T3, and whether to perform resource selection re-evaluation at a moment different from the moment m-T3 depends on UE implementation.

In addition, perform, in the $(i+1)^{th}$ period, resource selection re-evaluation on the resource in a case that it is determined, in the $j^{th}$ period, that the resource in the $(i+1)^{th}$ period meets a resource re-selection condition, thereby finally determining whether to perform resource re-selection. In this way, resource collision and interference can be avoided; and reliability of sidelink transmission can be ensured.

In some embodiments, the sending terminal performs virtual resource selection at a triggering moment of resource selection re-evaluation, obtaining the candidate resource set, obtaining a quality parameter threshold of the candidate resource set, and using the quality parameter threshold as a quality parameter threshold of resource selection re-evaluation. For example, a Media Access Control (MAC) layer provides a physical layer with resources on which resource selection re-evaluation needs to be performed. If the resource is after a resource selection window or PDB of a current TB, the UE performs virtual resource selection on the current TB, to obtain a quality parameter threshold used for determining whether to trigger resource re-selection for the resource, where the quality parameter threshold may be a Reference Signal Receiving Power (RSRP) threshold. In some implementations, the RSRP threshold may have a plurality of values. Each value is associated with a priority, namely, an internal parameter $Th(p_i)$. Whether resource re-selection of a to-be-evaluated resource is triggered can be determined based on an RSRP threshold matched with a priority that is associated with the resource and that is detected on SCI. Alternatively, the quality parameter threshold may be stipulated in a protocol, or configured or pre-configured by a control node.

In some embodiments, the performing, in the $(i+1)^{th}$ period, resource selection re-evaluation on the resource includes:

performing, in the $(i+1)^{th}$ period, aperiodic resource reservation indication on the resource, and performing resource selection re-evaluation at a first moment before the aperiodic reservation indication is performed on the resource for the first time, where the first moment is not later than a second moment, the second moment is before a moment m, an interval between the second moment and the moment m is T3, the moment m is a moment when aperiodic resource reservation indication information is sent for the first time, and T3 includes at least duration of performing resource selection processing by the sending terminal.

If it is determined that resource re-selection for the resource is triggered, the UE may not reserve, in the $j^{th}$ period, the resource in the $(i+1)^{th}$ period; perform, in the $(i+1)^{th}$ period, resource re-selection for the resource; or continue to perform, in the $(i+1)^{th}$ period, resource selection re-evaluation, thereby determining whether to perform resource re-selection.

In some embodiments, in a case that the resource in the $(i+1)^{th}$ period meets a resource re-selection condition after resource selection re-evaluation is performed on the periodic resources, the method further includes any one of the following:

performing re-selection from the resource in the $(i+1)^{th}$ period instead of all the periodic resources, and skipping periodically reserving a re-selected resource;

performing re-selection from the resource in the $(i+1)^{th}$ period instead of all the periodic resources, and periodically reserving a re-selected resource;

performing re-selection from the resource in the $(i+1)^{th}$ period instead of all the periodic resources, and enabling the sending terminal to periodically reserve a re-selected resource;

performing re-selection from all the periodic resources, and periodically reserving a re-selected resource; and performing re-selection from the resource in the $(i+1)^{th}$ period, enabling the sending terminal to perform re-selection from the periodic resources, and enabling the sending terminal to periodically reserve a re-selected resource.

Re-selection is performed on a re-evaluated resource. Whether to re-select a periodic resource corresponding to the resource depends on UE implementation; and/or, whether to periodically reserve the re-selected resource depends on UE implementation.

To avoid resource collision or interference, a control node may configure or pre-configure at least two sets of parameters, which are used for resource pre-emption detection and may include priority parameters and the like. One set of the parameters are used for normal use, and at least one other set of the parameters are used when the resource pre-emption detection condition is met. The resource pre-emption detection conditions include any one of the following:

resource reservation indication information of the periodic resources does not include an aperiodic resource reservation indication;

the resource reservation indication information of the periodic resources includes neither the aperiodic resource reservation indication nor a periodic resource reservation indication sent in the first P periods, where P is a positive integer, for example, P may be 1; and the resource reservation indication information of the periodic resources includes neither the aperiodic resource reservation indication nor a periodic resource reservation indication sent in the first Q time units, where Q is a positive integer. In an example, Q may be a maximum quantity of resource reservation periods configured for a 1000 ms/resource pool. The time unit may be an absolute time unit, for example, second, millisecond, slot, sub-slot, or logical slot.

In some embodiments, the releasing the periodic resources and/or performing resource re-selection from the periodic resources in a case that a preset resource selection triggering condition is met includes any one of the following operations:

In a case that a resource that is in the $(i+1)^{th}$ period and that has SL grant is not reserved by resource reservation indication information sent in first A periods, release the SL grant and/or perform resource re-selection for the SL grant, where A is positive integer, or may be a fixed parameter stipulated in a protocol, for example, A may be equal to 1. The A periods may be A consecutive periods or in-consecutive periods. For example, if no PSCCHs or PSSCHs are transmitted in the first A periods before the SL grant, the UE releases the SL grant, and/or performs resource re-selection on the SL grant.

In a case that the resource that is in the $(i+1)^{th}$ period and that has the SL grant is not reserved by resource reservation indication information sent in first M time units, release the SL grant and/or perform resource re-selection for the SL grant, where B is a positive integer, and may be a fixed parameter stipulated in a protocol, or a maximum quantity of resource reservation periods configured for a 1000 ms/resource pool, and the time unit may be an absolute time unit, for example, second, millisecond, slot, sub-slot, or logical slot. For example, if no PSCCHs or PSSCHs are transmitted in first B time units before the SL grant, the UE releases the SL grant, and/or performs resource re-selection on the SL grant.

In some embodiments, the resource exclusion condition includes any one of the following conditions:

For a resource in a resource selection window, it is detected, in the resource selection window or the first C time units of the resource, that resource reservation is performed on the resource by using the periodic resource reservation indication information, and that a quality parameter measurement value associated with the resource is greater than a corresponding quality parameter threshold, where C is a positive integer, and may be a fixed parameter stipulated in a protocol. For example, C may be a maximum quantity of resource reservation periods configured for a 1000 ms/resource pool. The time unit may be an absolute time unit, for example, second, millisecond, slot, sub-slot, or logical slot. A quality parameter measurement value may be an RSRP measurement value. A quality parameter threshold may be an RSRP threshold.

For the resource in the resource selection window, it is detected that the resource is a periodic resource, for example, a periodic resource of other UE, resource reservation indication information is detected within the first D periods of the resource, and the quality parameter measurement value associated with the resource is greater than the corresponding quality parameter threshold, where D is a positive integer, a quality parameter measurement value may be an RSRP measurement value, and a quality parameter threshold may be an RSRP threshold.

To prevent the UE from reserving too many resources and to reduce a system load, a maximum quantity or an actual quantity of resources in one resource period is any one of the following:

a transmission resource quantity determined or selected by SL grant during initial resource selection; and a value stipulated in a protocol, configured by a control node, or pre-configured by a control node.

The value stipulated in the protocol, configured by the control node, or pre-configured by the control node includes any one of the following:

a maximum quantity of transmission times that is of a Transmission Block (TB) and that is stipulated in the protocol;

a maximum quantity of transmission times that is of a TB and that is configured by a resource pool;

a maximum quantity of transmission times that is of a TB and that is configured by a resource pool based on a current Constant Bit Rate (CBR); and a maximum quantity of transmission times that is of a TB and that is configured by a resource pool based on a current CBR and a priority of the TB.

A maximum quantity or an actual quantity of resources in one resource period is any one of the following:

a quantity of available resources in one period of an SL grant;

a quantity of reserved resources in one period of an SL grant, including periodic resources and/or aperiodic resources;

a sum of a quantity of resources reserved but released in one period in an SL grant and a quantity of available resources in the period; and a sum of a quantity of resources reserved but released in one period in an SL grant and a quantity of available resources reserved in the period.

A resource reserved but released in one period in the SL grant may be interpreted as follows: The UE has indicated reservation of the resource, but it is determined that the resource has been released from the SL grant due to resource selection re-evaluation or pre-emption detection.

In some embodiments, the method further includes: selecting, by the sending terminal, a resource from the candidate resource set, where the sending terminal is capable of selecting only a resource whose time is not overlapped;

the sending terminal is capable of preferentially selecting a resource whose time is not overlapped; or the sending terminal is enabled to select a resource whose time is not overlapped, that is, the UE may not select a transmission resource any more if the candidate resource set does not have a resource that meets the condition (time is not overlapped).

In a case that the sending terminal is capable of selecting only the resource whose time is not overlapped, if the candidate resource set does not have a resource that meets the condition, the UE does not select a transmission resource any more, and the sending terminal performs any one of the following operations:

before selecting the resource from the candidate resource set, excluding a resource whose time is overlapped with that of a selected resource, and performing random resource selection; and performing random resource selection from the candidate resource set repeatedly until the resource whose time is not overlapped with the selected resource is selected.

The sending terminal preferentially selects a resource whose time is not overlapped, and the UE is enabled to select a transmission resource whose time is overlapped, only when the candidate resource set does not have a resource that meets the condition (time is not overlapped).

That the sending terminal is capable of preferentially selecting a resource whose time is not overlapped includes:

the sending terminal is enabled to select the resource whose time is overlapped in a case that a current SL grant does not select any resources or a quantity of selected resources is less than a preset resource quantity threshold.

Figure 4:
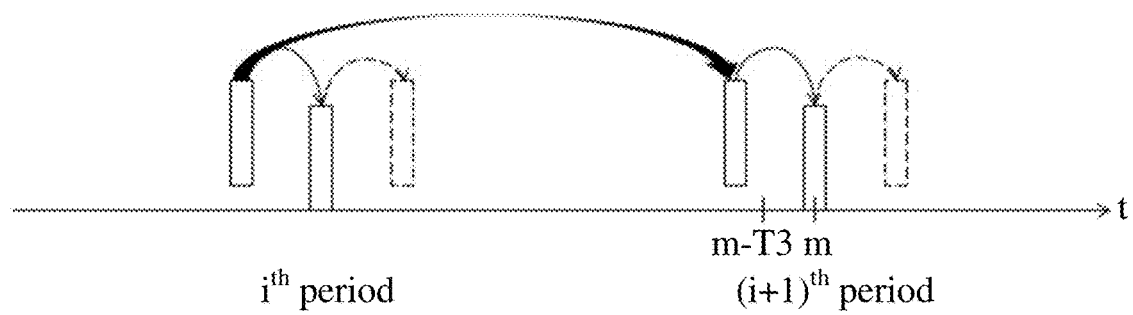
FIG. 4 to FIG. 7 are schematic diagrams of resource selection re-evaluation of periodic resources according to an embodiment of this application.

In an embodiment, as shown in FIG. 4, the UE selects three periodic resources. The UE performs Hybrid Automatic Repeat reQuest (HARQ)—based PSSCH transmission in an $i^{th}$ period. Assuming that during the PSSCH transmission, the UE reserves only the first two resources in the $i^{th}$ period (that is, the third resource denoted by the dashed line is not reserved aperiodically in the $i^{th}$ period), the UE is incapable of indicating reservation of the third periodic resource in the $i^{th}$ period. The UE may perform resource selection re-evaluation on the third periodic resource in the $(i+1)^{th}$ period. For example, resource selection re-evaluation is performed on the resource at a moment m-T3 before the resource is indicated (for example, indicated for aperiodic reservation).

Figure 5:
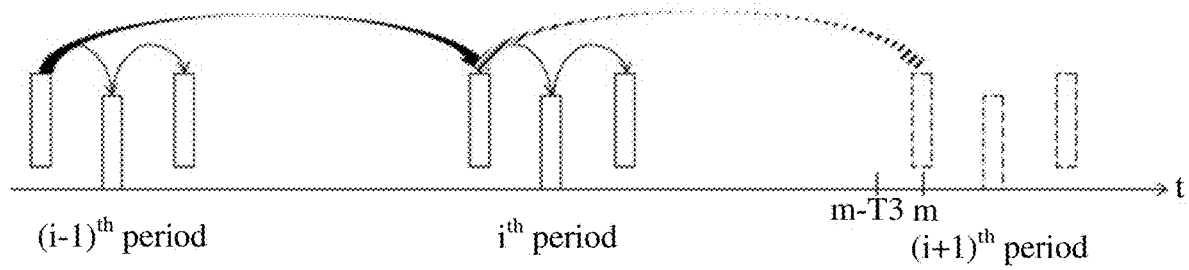

In an embodiment, as shown in FIG. 5, the UE selects three periodic resources. The UE neither transmits a PSSCH in the $i^{th}$ period, nor performs periodic resource reservation indication in the $i^{th}$ period for resources in the $(i+1)^{th}$ period. The UE may perform resource selection re-evaluation on the third periodic resource in the $(i+1)^{th}$ period. For example, resource selection re-evaluation is performed on the resource at the moment m-T3 before the resource in the $(i+1)^{th}$ period is indicated (for example, indicated for aperiodic reservation).

Figure 6:
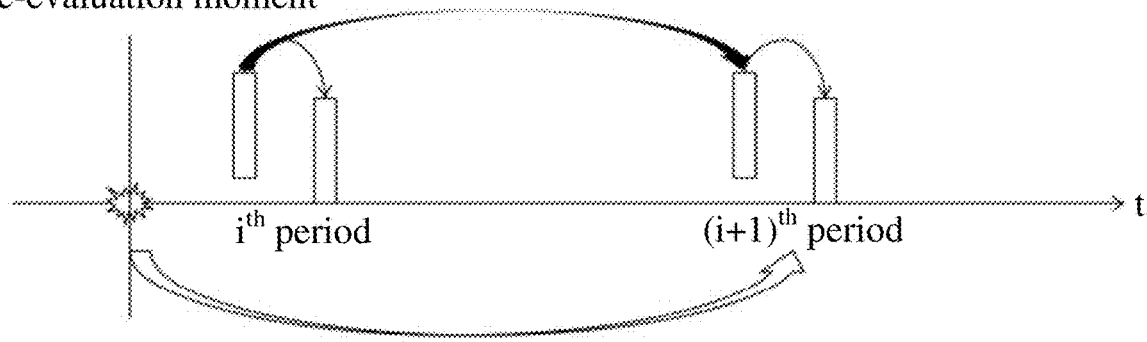

In an embodiment, as shown in FIG. 6, resource selection re-evaluation may be performed on the resource in the $(i+1)^{th}$ period before resource reservation indication is performed on the resource in the $(i+1)^{th}$ period based on reservation information in the $i^{th}$ period.

Figure 7:
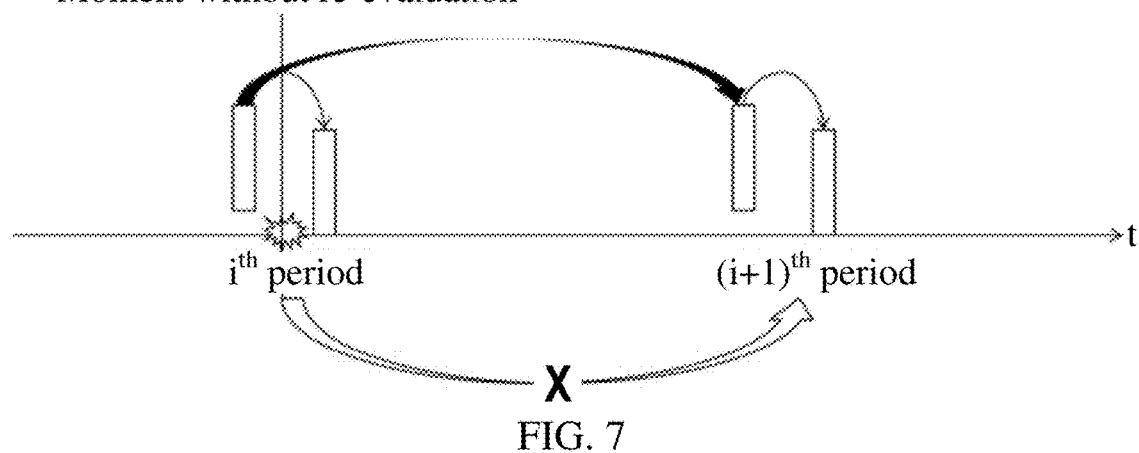

In an embodiment, as shown in FIG. 7, resource selection re-evaluation cannot be performed on the resource in the $(i+1)^{th}$ period after resource reservation indication is performed on the resource in the $(i+1)^{th}$ period based on reservation information in the $i^{th}$ period.

Figure 8:
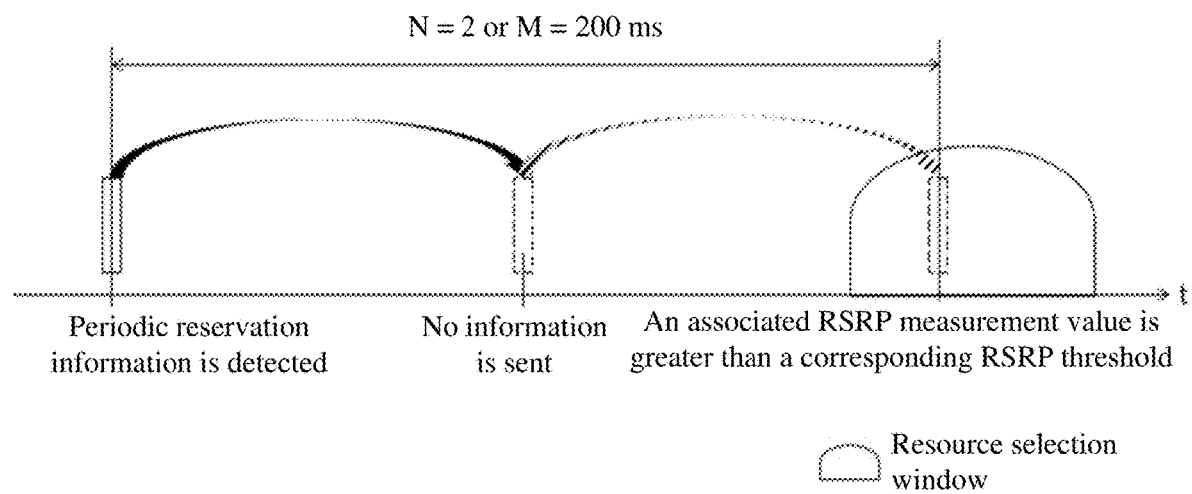
FIG. 8 is a schematic diagram for excluding a periodic resource from a candidate resource set according to an embodiment of this application.

In an embodiment, as shown in FIG. 8, for a resource in the resource selection window, if resource reservation information of the resource is detected 200 ms or 2 periods before the resource selection window, and an associated RSRP measurement value is greater than a corresponding RSRP threshold, the resource cannot be included in the candidate resource set.

It should be noted that the resource selection method provided in the embodiments of this application may be performed by a resource selection apparatus or a control module included in the resource selection apparatus and configured to execute the resource selection method. In the embodiments of this application, the resource selection method being performed by a resource selection apparatus is used as an example to describe the resource selection method provided in the embodiments of this application.

Figure 9:
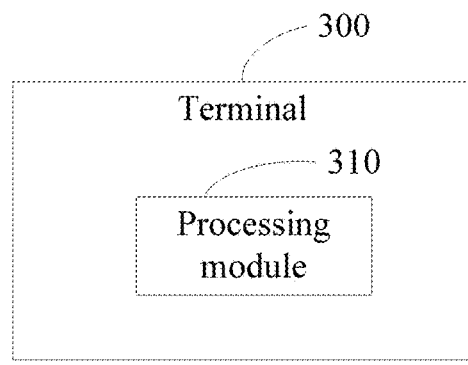
FIG. 9 is a schematic structural diagram of a resource selection apparatus according to an embodiment of this application.

An embodiment of this application provides a resource selection apparatus. As shown in FIG. 9, the apparatus is applied to a terminal 300 and includes:

a processing module 310, configured to perform any one of the following operations on selected and/or reserved periodic resources:

performing resource selection re-evaluation on the periodic resources in a case that a preset re-evaluation condition is met;

using an independent parameter for resource pre-emption detection of the periodic resources in a case that a preset resource pre-emption detection condition is met;

releasing the periodic resources and/or performing resource re-selection from the periodic resources in a case that a preset resource selection triggering condition is met; and excluding the periodic resources from a candidate resource set in a case that a preset resource exclusion condition is met.

In this embodiment, when a certain condition is met, a sending terminal performs resource selection re-evaluation on periodic resources selected and/or reserved by the sending terminal; uses an independent parameter for resource pre-emption detection of the periodic resources; releases the periodic resources and/or performs resource re-selection from the periodic resources; or excludes the periodic resources from a candidate resource set. Through the above operations, the problems of resource collision and resource interference can be resolved, to enhance reliability of sidelink transmission.

In some embodiments, the processing module 310 is configured to perform any one of the following operations:

for a resource in the $(i+1)^{th}$ period of the periodic resources, performing resource selection re-evaluation on the resource in a case that the sending terminal does not send, in N periods before the $(i+1)^{th}$ period, Sidelink Control Information (SCI) to periodically reserve the resource in the $(i+1)^{th}$ period, where i and N are positive integers;

for a resource in the $(i+1)^{th}$ period of the periodic resources, performing resource selection re-evaluation on the resource in a case that the sending terminal does not send, in M time units before the $(i+1)^{th}$ period, SCI to periodically reserve the resource in the $(i+1)^{th}$ period, where M is a positive integer; and for a resource in the $(i+1)^{th}$ period of the periodic resources, performing resource selection re-evaluation on at least part of the resource in the $(i+1)^{th}$ period in a case that a quantity of resources that are not indicated by periodic reservation information in L periods before the $(i+1)^{th}$ period reaches a preset value, where L is a positive integer.

In some embodiments, the processing module 310 is configured to: perform, in the $(i+1)^{th}$ period, aperiodic resource reservation indication on the resource, and perform resource selection re-evaluation at a first moment before the aperiodic reservation indication is performed on the resource for the first time, where the first moment is not later than a second moment, the second moment is before a moment m, an interval between the second moment and the moment m is T3, the moment m is a moment when aperiodic resource reservation indication information is sent for the first time, and T3 includes at least duration of performing resource selection processing by the sending terminal.

In some embodiments, the processing module 310 is configured to perform, in the $j^{th}$ period before the $(i+1)^{th}$ period, resource selection re-evaluation on the resource in the $(i+1)^{th}$ period, where j is a positive integer less than or equal to i.

In some embodiments, the processing module 310 is configured to: perform, in the $j^{th}$ period, periodic resource reservation indication on the resource in the $(i+1)^{th}$ period, and perform resource selection re-evaluation at a first moment before the periodic reservation indication is performed on the resource for the first time, where the first moment is not later than a second moment, the second moment is before a moment m, an interval between the second moment and the moment m is T3, the moment m is a moment when periodic resource reservation indication information is sent for the first time, and T3 includes at least duration of performing resource selection processing by the sending terminal.

In some embodiments, the processing module 310 is configured to perform, in the $(i+1)^{th}$ period, resource selection re-evaluation on the resource in a case that it is determined, in the $j^{th}$ period, that the resource in the $(i+1)^{th}$ period meets a resource re-selection condition.

In some embodiments, the processing module 310 is configured to: perform, in the $(i+1)^{th}$ period, aperiodic resource reservation indication on the resource, and perform resource selection re-evaluation at a first moment before the aperiodic reservation indication is performed on the resource for the first time, where the first moment is not later than a second moment, the second moment is before a moment m, an interval between the second moment and the moment m is T3, the moment m is a moment when aperiodic resource reservation indication information is sent for the first time, and T3 includes at least duration of performing resource selection processing by the sending terminal.

In some embodiments, the processing module 310 is configured to: perform virtual resource selection at a triggering moment of resource selection re-evaluation, obtain the candidate resource set, obtain a quality parameter threshold of the candidate resource set, and use the quality parameter threshold as a quality parameter threshold of resource selection re-evaluation.

In some embodiments, the processing module 310 is configured to perform any one of the following operations:

performing re-selection from the resource in the $(i+1)^{th}$ period instead of all the periodic resources, and skipping periodically reserving a re-selected resource;

performing re-selection from the resource in the $(i+1)^{th}$ period instead of all the periodic resources, and periodically reserving a re-selected resource;

performing re-selection from the resource in the $(i+1)^{th}$ period instead of all the periodic resources, and enabling the sending terminal to periodically reserve a re-selected resource;

performing re-selection from all the periodic resources, and periodically reserving a re-selected resource; and performing re-selection from the resource in the $(i+1)^{th}$ period, enabling the sending terminal to perform re-selection from the periodic resources, and enabling the sending terminal to periodically reserve a re-selected resource.

In some embodiments, the resource pre-emption detection condition includes any one of the following:

resource reservation indication information of the periodic resources does not include an aperiodic resource reservation indication;

the resource reservation indication information of the periodic resources includes neither the aperiodic resource reservation indication nor a periodic resource reservation indication sent in the first P periods, where P is a positive integer; and the resource reservation indication information of the periodic resources includes neither the aperiodic resource reservation indication nor a periodic resource reservation indication sent in the first Q time units, where Q is a positive integer.

In some embodiments, the processing module 310 is configured to perform any one of the following operations:

in a case that a resource that is in the $(i+1)^{th}$ period and that has sidelink grant SL grant is not reserved by resource reservation indication information sent in the first A periods, releasing the SL grant and/or performing resource re-selection for the SL grant, where A is a positive integer; and in a case that the resource that is in the $(i+1)^{th}$ period and that has the SL grant is not reserved by resource reservation indication information sent in the first B time units, releasing the SL grant and/or performing resource re-selection for the SL grant, where B is a positive integer.

In some embodiments, the resource exclusion condition includes any one of the following conditions:

for a resource in a resource selection window, it is detected, in the resource selection window or the first C time units of the resource, that resource reservation is performed on the resource by using the periodic resource reservation indication information, and that a quality parameter measurement value associated with the resource is greater than a corresponding quality parameter threshold, where C is a positive integer; and for the resource in the resource selection window, it is detected that the resource is a periodic resource, resource reservation indication information is detected within the first D periods of the resource, and the quality parameter measurement value associated with the resource is greater than the corresponding quality parameter threshold, where D is a positive integer.

In some embodiments, a maximum quantity or an actual quantity of resources in one resource period is any one of the following:

a transmission resource quantity determined or selected by SL grant during initial resource selection; and a value stipulated in a protocol, configured by a control node, or pre-configured by a control node.

The value stipulated in the protocol, configured by the control node, or pre-configured by the control node includes any one of the following:

a maximum quantity of transmission times that is of a TB and that is stipulated in the protocol;

a maximum quantity of transmission times that is of a TB and that is configured by a resource pool;

a maximum quantity of transmission times that is of a TB and that is configured by a resource pool based on a current CBR; and a maximum quantity of transmission times that is of a TB and that is configured by a resource pool based on a current CBR and a priority of the TB.

In some embodiments, a maximum quantity or an actual quantity of resources in one resource period is any one of the following:

a quantity of available resources in one period of an SL grant;

a quantity of reserved resources in one period of an SL grant;

a sum of a quantity of resources reserved but released in one period in an SL grant and a quantity of available resources in the period; and a sum of a quantity of resources reserved but released in one period in an SL grant and a quantity of available resources reserved in the period.

In some embodiments, when selecting a resource from the candidate resource set, the processing module 310 is configured to perform any one of the following operations:

selecting only a resource whose time is not overlapped;

preferentially selecting a resource whose time is not overlapped; and enabling selection of a resource whose time is not overlapped.

In some embodiments, when selecting only the resource whose time is not overlapped, the processing module 310 is configured to perform any one of the following operations:

before selecting the resource from the candidate resource set, excluding a resource whose time is overlapped with that of a selected resource, and performing random resource selection; and performing random resource selection from the candidate resource set repeatedly until the resource whose time is not overlapped with the selected resource is selected.

In some embodiments, the processing module 310 is configured to enable selection of the resource whose time is overlapped in a case that a current SL grant does not select any resources or a quantity of selected resources is less than a preset resource quantity threshold.

The resource selection apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like. The non-mobile electronic device may be a Network Attached Storage (NAS), a personal computer, a television, a teller machine, a self-service machine, or the like. This is not specifically limited in the embodiments of this application.

The resource selection apparatus in this embodiment of this application may be an apparatus with an operating system. The operating system may be an Android operating system, an iOS operating system, or another possible operating system, which is not specifically limited in the embodiments of this application.

An embodiment of this application further provides an electronic device, including a processor, a memory, and a program or an instruction stored in the memory and executable by the processor. When the program or instruction is executed by the processor, the processes of the foregoing embodiment of the resource selection method are implemented, with the same technical effects achieved. To avoid repetition, details are not described herein again.

It should be noted that the electronic device in this embodiment of this application includes the foregoing mobile electronic device and the foregoing non-mobile electronic device.

Figure 10:
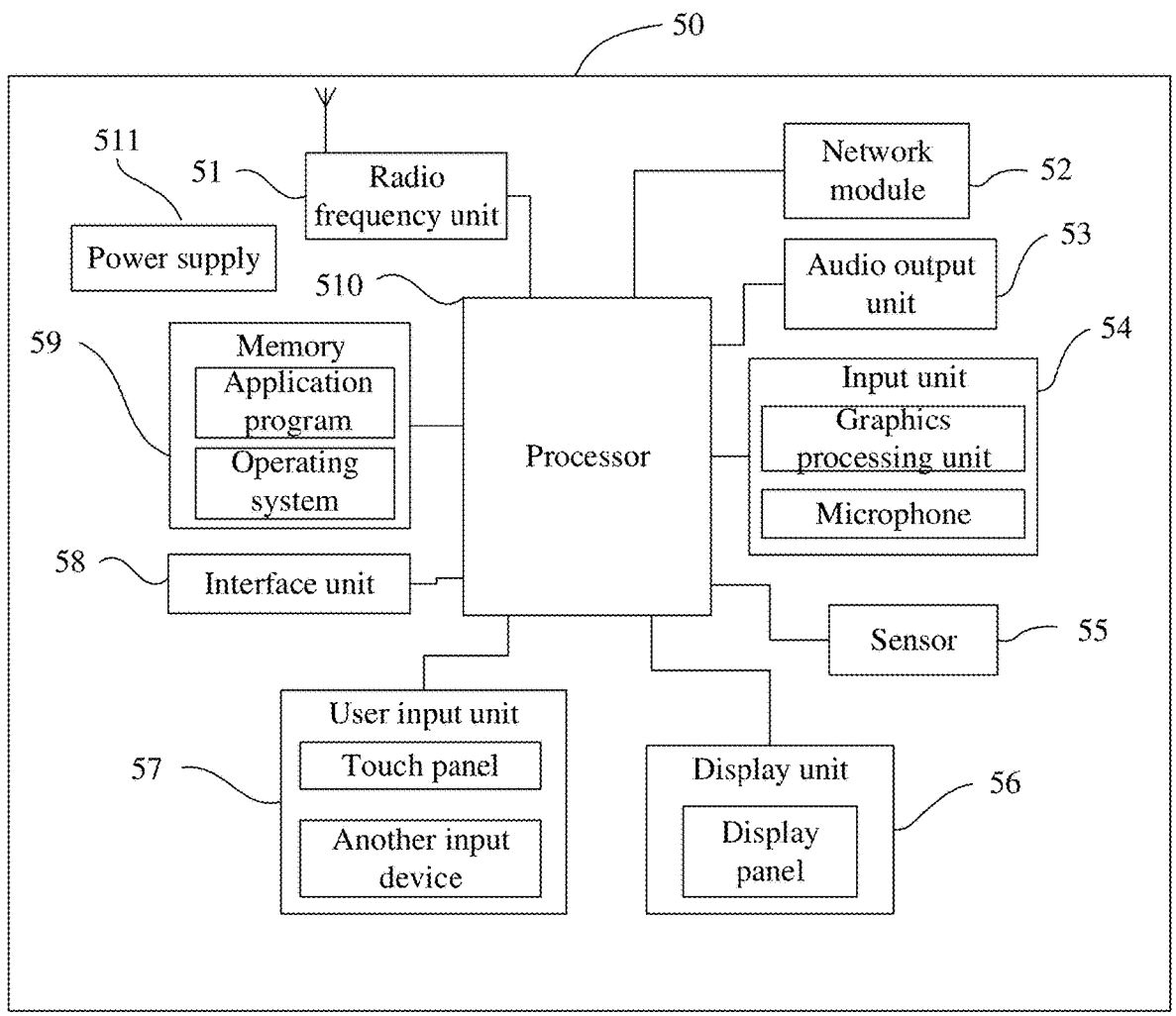
FIG. 10 is a schematic diagram of composition of a terminal according to an embodiment of this application.

The electronic device in this embodiment may be a terminal. FIG. 10 is a schematic diagram of a hardware structure of a terminal according to the embodiments of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. It can be understood by a person skilled in the art that, the terminal structure shown in FIG. 10 does not constitute any limitation on the terminal, and the terminal may include more or fewer components than those shown in the figure, or combine some components, or have different component arrangements. In this embodiment of this application, the terminal includes but is not limited to a mobile phone, a tablet computer, a notebook computer, a palmtop computer, an in-vehicle terminal, a wearable device, a pedometer, and the like.

It should be understood that, in this embodiment of this application, the radio frequency unit 51 may be configured to receive and send information or a signal in a call process. In some implementations, after receiving downlink data from a base station, the radio frequency unit 51 sends the downlink data to the processor 510 for processing. In addition, the radio frequency unit 51 sends uplink data to the base station. Usually, the radio frequency unit 51 includes but is not limited to an antenna, at least one amplifier, a transceiver, a coupler, a low noise amplifier, a duplexer, and the like. In addition, the radio frequency unit 51 may further communicate with a network and another device through a wireless communications system.

The memory 59 may be configured to store a software program and various pieces of data. The memory 59 may mainly include a program storage region and a data storage region. The program storage region may store an operating system, an application program required by at least one function (such as a sound play function or an image play function), and the like. The data storage region may store data (such as audio data or an address book) created based on use of the mobile phone, and the like. In addition, the memory 59 may include a high-speed random access memory, and may further include a nonvolatile memory, for example, at least one magnetic disk storage device, a flash storage device, or another volatile solid-state storage device.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or more processing units. Optionally, an application processor and a modem processor may be integrated into the processor 510. The application processor primarily processes the operating system, a user interface, the application program or indications, and the like. The modem processor primarily processes wireless communication, for example, being a baseband processor. It can be understood that, alternatively, the modem processor may not be integrated into the processor 510.

The terminal 50 may further include the power supply 511 (such as a battery) that supplies power to each component. Preferably, the power supply 511 may be logically connected to the processor 510 by using a power management system, so as to implement functions such as charging, discharging, and power consumption management by using the power management system.

In addition, the terminal 50 includes some function modules not shown, and details are not described herein.

The processor 510 is configured to perform any one of the following operations on selected and/or reserved periodic resources:
  performing resource selection re-evaluation on the periodic resources in a case that a preset re-evaluation condition is met;
  using an independent parameter for resource pre-emption detection of the periodic resources in a case that a preset resource pre-emption detection condition is met;
  releasing the periodic resources and/or performing resource re-selection from the periodic resources in a case that a preset resource selection triggering condition is met; and
  excluding the periodic resources from a candidate resource set in a case that a preset resource exclusion condition is met.

In this embodiment, when a certain condition is met, a sending terminal performs resource selection re-evaluation on periodic resources selected and/or reserved by the sending terminal; uses an independent parameter for resource pre-emption detection of the periodic resources; releases the periodic resources and/or performs resource re-selection from the periodic resources; or excludes the periodic resources from a candidate resource set. Through the above operations, the problems of resource collision and resource interference can be resolved, to enhance reliability of sidelink transmission.

In some embodiments, the processor 510 is configured to perform any one of the following operations:
  for a resource in the $(i+1)^{th}$ period of the periodic resources, performing resource selection re-evaluation on the resource in a case that the sending terminal does not send, in N periods before the $(i+1)^{th}$ period, SCI to periodically reserve the resource in the $(i+1)^{th}$ period, where i and N are positive integers;
  for a resource in the $(i+1)^{th}$ period of the periodic resources, performing resource selection re-evaluation on the resource in a case that the sending terminal does not send, in M time units before the $(i+1)^{th}$ period, SCI to periodically reserve the resource in the $(i+1)^{th}$ period, where M is a positive integer; and
  for a resource in the $(i+1)^{th}$ period of the periodic resources, performing resource selection re-evaluation on at least part of the resource in the $(i+1)^{th}$ period in a case that a quantity of resources that are not indicated by periodic reservation information in L periods before the $(i+1)^{th}$ period reaches a preset value, where L is a positive integer.

In some embodiments, the processor 510 is configured to: perform, in the $(i+1)^{th}$ period, aperiodic resource reservation indication on the resource, and perform resource selection re-evaluation at a first moment before the aperiodic reservation indication is performed on the resource for the first time, where the first moment is not later than a second moment, the second moment is before a moment m, an interval between the second moment and the moment m is T3, the moment m is a moment when aperiodic resource reservation indication information is sent for the first time, and T3 includes at least duration of performing resource selection processing by the sending terminal.

In some embodiments, the processor 510 is configured to perform, in the $j^{th}$ period before the $(i+1)^{th}$ period, resource selection re-evaluation on the resource in the $(i+1)^{th}$ period, where j is a positive integer less than or equal to i.

In some embodiments, the processor 510 is configured to: perform, in the $j^{th}$ period, periodic resource reservation indication on the resource in the $(i+1)^{th}$ period, and perform resource selection re-evaluation at a first moment before the periodic reservation indication is performed on the resource for the first time, where the first moment is not later than a second moment, the second moment is before a moment m, an interval between the second moment and the moment m is T3, the moment m is a moment when periodic resource reservation indication information is sent for the first time, and T3 includes at least duration of performing resource selection processing by the sending terminal.

In some embodiments, the processor 510 is configured to perform, in the $(i+1)^{th}$ period, resource selection re-evaluation on the resource in a case that it is determined, in the $j^{th}$ period, that the resource in the $(i+1)^{th}$ period meets a resource re-selection condition.

In some embodiments, the processor 510 is configured to: perform, in the $(i+1)^{th}$ period, aperiodic resource reservation indication on the resource, and perform resource selection re-evaluation at a first moment before the aperiodic reservation indication is performed on the resource for the first time, where the first moment is not later than a second moment, the second moment is before a moment m, an interval between the second moment and the moment m is T3, the moment m is a moment when aperiodic resource reservation indication information is sent for the first time, and T3 includes at least duration of performing resource selection processing by the sending terminal.

In some embodiments, the processor 510 is configured to: perform, by the sending terminal, virtual resource selection at a triggering moment of resource selection re-evaluation, obtain the candidate resource set, obtain a quality parameter threshold of the candidate resource set, and use the quality parameter threshold as a quality parameter threshold of resource selection re-evaluation.

In some embodiments, the processor 510 is configured to perform any one of the following operations:
  performing re-selection from the resource in the $(i+1)^{th}$ period instead of all the periodic resources, and skipping periodically reserving a re-selected resource;
  performing re-selection from the resource in the $(i+1)^{th}$ period instead of all the periodic resources, and periodically reserving a re-selected resource;
  performing re-selection from the resource in the $(i+1)^{th}$ period instead of all the periodic resources, and enabling the sending terminal to periodically reserve a re-selected resource;
  performing re-selection from all the periodic resources, and periodically reserving a re-selected resource; and
  performing re-selection from the resource in the $(i+1)^{th}$ period, enabling the sending terminal to perform re-selection from the periodic resources, and enabling the sending terminal to periodically reserve a re-selected resource.

In some embodiments, the resource pre-emption detection condition includes any one of the following:
  resource reservation indication information of the periodic resources does not include an aperiodic resource reservation indication;
  the resource reservation indication information of the periodic resources includes neither the aperiodic resource reservation indication nor a periodic resource reservation indication sent in the first P periods, where P is a positive integer; and
  the resource reservation indication information of the periodic resources includes neither the aperiodic resource reservation indication nor a periodic resource reservation indication sent in the first Q time units, where Q is a positive integer.

In some embodiments, the processor 510 is configured to perform any one of the following operations:
  in a case that a resource that is in the $(i+1)^{th}$ period and that has sidelink grant SL grant is not reserved by resource reservation indication information sent in the first A periods, releasing the SL grant and/or performing resource re-selection for the SL grant, where A is positive integer; and
  in a case that the resource that is in the $(i+1)^{th}$ period and that has the SL grant is not reserved by resource reservation indication information sent in the first M time units, releasing the SL grant and/or performing resource re-selection for the SL grant, where B is a positive integer.

In some embodiments, the resource exclusion condition includes any one of the following conditions:
  for a resource in a resource selection window, it is detected, in the resource selection window or the first C time units of the resource, that resource reservation is performed on the resource by using the periodic resource reservation indication information, and that a quality parameter measurement value associated with the resource is greater than a corresponding quality parameter threshold, where C is a positive integer; and
  for the resource in the resource selection window, it is detected that the resource is a periodic resource, resource reservation indication information is detected within the first D periods of the resource, and the quality parameter measurement value associated with the resource is greater than the corresponding quality parameter threshold, where D is a positive integer.

In some embodiments, a maximum quantity or an actual quantity of resources in one resource period is any one of the following:
  a transmission resource quantity determined or selected by SL grant during initial resource selection; and
  a value stipulated in a protocol, configured by a control node, or pre-configured by a control node.

The value stipulated in the protocol, configured by the control node, or pre-configured by the control node includes any one of the following:
  a maximum quantity of transmission times that is of a transmission block TB and that is stipulated in the protocol;
  a maximum quantity of transmission times that is of a TB and that is configured by a resource pool;
  a maximum quantity of transmission times that is of a TB and that is configured by a resource pool based on a current constant bit rate CBR; and
  a maximum quantity of transmission times that is of a TB and that is configured by a resource pool based on a current CBR and a priority of the TB.

In some embodiments, a maximum quantity or an actual quantity of resources in one resource period is any one of the following:
  a quantity of available resources in one period of an SL grant;
  a quantity of reserved resources in one period of an SL grant;
  a sum of a quantity of resources reserved but released in one period in an SL grant and a quantity of available resources in the period; and
  a sum of a quantity of resources reserved but released in one period in an SL grant and a quantity of available resources reserved in the period.

In some embodiments, when selecting a resource from the candidate resource set, the processor 510 is configured to perform any one of the following operations:
  selecting only a resource whose time is not overlapped;
  preferentially selecting a resource whose time is not overlapped; and
  enabling selection of a resource whose time is not overlapped.

In some embodiments, when selecting only the resource whose time is not overlapped, the processor 510 is configured to perform any one of the following operations:

before selecting the resource from the candidate resource set, excluding a resource whose time is overlapped with that of a selected resource, and performing random resource selection; and performing random resource selection from the candidate resource set repeatedly until the resource whose time is not overlapped with the selected resource is selected.

In some embodiments, the processor 510 is configured to enable selection of the resource whose time is overlapped in a case that a current SL grant does not select any resources or a quantity of selected resources is less than a preset resource quantity threshold.

An embodiment of this application further provides a readable storage medium. The readable storage medium stores a program or an instruction, and when the program or instruction is executed by a processor, the processes of the foregoing embodiment of the resource selection method are implemented, with the same technical effects achieved. To avoid repetition, details are not described herein again.

The processor is a processor in the electronic device in the foregoing embodiment. The readable storage medium includes a computer-readable storage medium, for example, a computer Read-Only Memory (ROM), a Random Access Memory (RAM), a magnetic disk, or an optical disc.

An embodiment of this application further provides a chip. The chip includes a processor and a communications interface, where the communications interface is coupled to the processor, and the processor is configured to run a program or an instruction to implement the processes of the foregoing embodiment of the resource selection method, with the same technical effects achieved. To avoid repetition, details are not described herein again.

It should be understood that the chip mentioned in this embodiment of this application may also be referred to as a system-level chip, a system chip, a system on chip, a system chip on chip, or the like.

An embodiment of this application further provides a computer program product. The computer program product is stored in a non-volatile storage medium, and configured to be executed by at least one processor to implement the processes of the foregoing embodiment of the resource selection method, with the same technical effects achieved. To avoid repetition, details are not described herein again.

It can be understood that the embodiments described in the present disclosure may be implemented by hardware, software, firmware, middleware, microcode, or a combination thereof. For hardware implementation, a module, a unit, a submodule, a subunit, or the like may be implemented in one or more Application Specific Integrated Circuits (ASIC), Digital Signal Processing (DSP), DSP Device (DSPD), Programmable Logic Device (PLD), Field-Programmable Gate Array (FPGA), general-purpose processors, controllers, microcontrollers, microprocessors, or other electronic units or a combination thereof used to perform the functions in this application.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in the form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A resource selection method, comprising:
performing, by a sending terminal, one or more operations on periodic resources selected or reserved by the sending terminal, the one or more operations comprising:
when the sending terminal does not send, in N periods before an $(i+1)^{th}$ period, Sidelink Control Information (SCI) to periodically reserve a resource in the $(i+1)^{th}$ period, performing resource selection re-evaluation on the resource in the $(i+1)^{th}$ period, wherein i and N are positive integers.

2. The resource selection method according to claim 1, wherein performing resource selection re-evaluation on the resource in the $(i+1)^{th}$ period comprises:
performing resource selection re-evaluation on the resource in the $(i+1)^{th}$ period before resource indication is performed on the resource in the $(i+1)^{th}$ period by a time resource assignment indication field for a first time.

3. The resource selection method according to claim 1, further comprising:
performing, by the sending terminal, virtual resource selection at a triggering moment of resource selection re-evaluation, obtaining a candidate resource set, obtaining a quality parameter threshold of the candidate resource set, and using the quality parameter threshold of the candidate resource set as a quality parameter threshold of resource selection re-evaluation.

4. The resource selection method according to claim 1, wherein when the resource in the $(i+1)^{th}$ period meets a resource re-selection condition after resource selection re-evaluation is performed on the periodic resources, the method further comprises any one of the following:

performing re-selection from the resource in the $(i+1)^{th}$ period instead of all the periodic resources, and skipping periodically reserving a re-selected resource;

performing re-selection from the resource in the $(i+1)^{th}$ period instead of all the periodic resources, and periodically reserving a re-selected resource;

performing re-selection from the resource in the $(i+1)^{th}$ period instead of all the periodic resources, and enabling the sending terminal to periodically reserve a re-selected resource;

performing re-selection from all the periodic resources, and periodically reserving a re-selected resource; or performing re-selection from the resource in the $(i+1)^{th}$ period, enabling the sending terminal to perform re-selection from the periodic resources, and enabling the sending terminal to periodically reserve a re-selected resource.

5. The resource selection method according to claim 1, wherein the one or more operations further comprise using an independent parameter for resource pre-emption detection of the periodic resources when a resource pre-emption detection condition is met, and
wherein the resource pre-emption detection condition comprises any one of the following:
resource reservation indication information of the periodic resources does not comprise an aperiodic resource reservation indication;
the resource reservation indication information of the periodic resources comprises neither the aperiodic resource reservation indication nor a periodic resource reservation indication sent in first P periods, wherein P is a positive integer; or
the resource reservation indication information of the periodic resources comprises neither the aperiodic resource reservation indication nor a periodic resource reservation indication sent in first Q time units, wherein Q is a positive integer.

6. The resource selection method according to claim 1, wherein the one or more operations further comprise releasing the periodic resources or performing resource re-selection from the periodic resources when a preset resource selection triggering condition is met, comprising any one of the following operations:
when a resource that is in the $(i+1)^{th}$ period and that has SideLink (SL) grant is not reserved by resource reservation indication information sent in first A periods, releasing the SL grant or performing resource re-selection for the SL grant, wherein A is positive integer; or
when the resource that is in the $(i+1)^{th}$ period and that has the SL grant is not reserved by resource reservation indication information sent in first B time units, releasing the SL grant or performing resource re-selection for the SL grant, wherein B is a positive integer.

7. The resource selection method according to claim 1, wherein the one or more operations further comprise excluding the periodic resources from a candidate resource set when a resource exclusion condition is met, wherein the resource exclusion condition comprises any one of the following conditions:
for a first resource in a resource selection window, it is detected, in the resource selection window or first C time units of the first resource, that resource reservation is performed on the first resource by using periodic resource reservation indication information, and that a quality parameter measurement value associated with the first resource is greater than a corresponding quality parameter threshold, wherein C is a positive integer; or
for the first resource in the resource selection window, it is detected that the first resource is a periodic resource, resource reservation indication information is detected within first D periods of the resource, and the quality parameter measurement value associated with the first resource is greater than the corresponding quality parameter threshold, wherein D is a positive integer.

8. The resource selection method according to claim 1, wherein a maximum quantity or an actual quantity of resources in one resource period is any one of the following:
a transmission resource quantity determined or selected by SideLink (SL) grant during initial resource selection; or
a value stipulated in a protocol, configured by a control node, or pre-configured by the control node.

9. The resource selection method according to claim 8, wherein the value stipulated in the protocol, configured by the control node, or pre-configured by the control node comprises any one of the following:
a maximum quantity of transmission times that is of a Transmission Block (TB) and that is stipulated in the protocol;
a maximum quantity of transmission times that is of a TB and that is configured by a resource pool;
a maximum quantity of transmission times that is of a TB and that is configured by a resource pool based on a current Constant Bit Rate (CBR); or
a maximum quantity of transmission times that is of a TB and that is configured by a resource pool based on a current CBR and a priority of the TB.

10. The resource selection method according to claim 8, wherein a maximum quantity or an actual quantity of resources in one resource period is any one of the following:
a quantity of available resources in one period of an SL grant;
a quantity of reserved resources in one period of an SL grant;
a sum of a quantity of resources reserved but released in one period in an SL grant and a quantity of available resources in the period; or
a sum of a quantity of resources reserved but released in one period in an SL grant and a quantity of available resources reserved in the period.

11. The resource selection method according to claim 1, further comprising: selecting, by the sending terminal, a resource from a candidate resource set, wherein:
the sending terminal is capable of selecting only a resource whose time is not overlapped;
the sending terminal is capable of preferentially selecting a resource whose time is not overlapped; or
the sending terminal is enabled to select a resource whose time is not overlapped.

12. The resource selection method according to claim 11, wherein when the sending terminal is capable of selecting only the resource whose time is not overlapped, the method further comprises performing any one of the following operations:
before selecting the resource from the candidate resource set, excluding a resource whose time is overlapped with that of a selected resource, and performing random resource selection; or
performing random resource selection from the candidate resource set repeatedly until the resource whose time is not overlapped with the selected resource is selected.

13. The resource selection method according to claim 11, wherein that the sending terminal is capable of preferentially selecting a resource whose time is not overlapped comprises:

the sending terminal is enabled to select the resource whose time is overlapped when a current SideLink (SL) grant does not select any resources or a quantity of selected resources is less than a preset resource quantity threshold.

14. An electronic device, comprising:
a memory storing computer-readable instructions; and
a processor coupled to the memory and configured to execute the computer-readable instructions, wherein the computer-readable instructions, when executed by the processor, cause the processor to perform operations comprising:
performing, by a sending terminal, one or more operations on periodic resources selected or reserved by the sending terminal, the one or more operations comprising:
when the sending terminal does not send, in N periods before an $(i+1)^{th}$ period, Sidelink Control Information (SCI) to periodically reserve a resource in the $(i+1)^{th}$ period, performing resource selection re-evaluation on the resource in the $(i+1)^{th}$ period, wherein i and N are positive integers.

15. A non-transitory computer-readable medium storing instructions that, when executed by a processor, cause the processor to perform operations comprising:
performing, by a sending terminal, one or more operations on periodic resources selected or reserved by the sending terminal, the one or more operations comprising:
when the sending terminal does not send, in N periods before an $(i+1)^{th}$ period, Sidelink Control Information (SCI) to periodically reserve a resource in the $(i+1)^{th}$ period, performing resource selection re-evaluation on the resource in the $(i+1)^{th}$ period, wherein i and N are positive integers.

16. The resource selection method according to claim 2, wherein performing resource selection re-evaluation on the resource in the $(i+1)^{th}$ period further comprises:
performing resource selection re-evaluation on the resource at a moment m-T3, wherein m is a moment when time resource assignment indication information is sent for the first time, and T3 comprises at least duration of performing resource selection processing by the sending terminal.

17. The electronic device according to claim 14, wherein performing resource selection re-evaluation on the resource in the $(i+1)^{th}$ period comprises:
performing resource selection re-evaluation on the resource in the $(i+1)^{th}$ period before resource indication is performed on the resource in the $(i+1)^{th}$ period by a time resource assignment indication field for a first time.

18. The electronic device according to claim 17, wherein performing resource selection re-evaluation on the resource in the $(i+1)^{th}$ period further comprises:
performing resource selection re-evaluation on the resource at a moment m-T3, wherein m is a moment when time resource assignment indication information is sent for the first time, and T3 comprises at least duration of performing resource selection processing by the sending terminal.

19. The electronic device according to claim 14, wherein the one or more operations further comprise using an independent parameter for resource pre-emption detection of the periodic resources when a resource pre-emption detection condition is met, and
wherein the resource pre-emption detection condition comprises any one of the following:
resource reservation indication information of the periodic resources does not comprise an aperiodic resource reservation indication;
the resource reservation indication information of the periodic resources comprises neither the aperiodic resource reservation indication nor a periodic resource reservation indication sent in first P periods, wherein P is a positive integer; or
the resource reservation indication information of the periodic resources comprises neither the aperiodic resource reservation indication nor a periodic resource reservation indication sent in first Q time units, wherein Q is a positive integer.

20. The electronic device according to claim 14, wherein the one or more operations further comprise releasing the periodic resources or performing resource re-selection from the periodic resources when a preset resource selection triggering condition is met, comprising any one of the following operations:
when a resource that is in the $(i+1)^{th}$ period and that has SideLink (SL) grant is not reserved by resource reservation indication information sent in first A periods, releasing the SL grant or performing resource re-selection for the SL grant, wherein A is positive integer; or
when the resource that is in the $(i+1)^{th}$ period and that has the SL grant is not reserved by resource reservation indication information sent in first B time units, releasing the SL grant or performing resource re-selection for the SL grant, wherein B is a positive integer.

* * * * *